United States Patent [19]

Haung

[11] Patent Number: 5,478,102
[45] Date of Patent: Dec. 26, 1995

[54] FOLDING BABY CARRIAGE

[76] Inventor: Mark Haung, 58, Ma Yuan West St., Taichung, Taiwan

[21] Appl. No.: 443,733

[22] Filed: May 18, 1995

[51] Int. Cl.$^6$ ........................................................ B62B 7/06
[52] U.S. Cl. ............................................ 280/642; 280/650
[58] Field of Search ................................ 280/642, 643, 280/647, 648, 650, 47.4, 657, 658; 297/16.1, 31, 374; 403/91, 101, 102, 106, 326, 327

[56] References Cited

U.S. PATENT DOCUMENTS 2,803,470  8/1957  Welsh ........................................ 280/642
5,370,408  12/1994 Eagan ........................................ 280/642
5,421,603  6/1995  Wills et al. ............................... 280/642
5,427,402  6/1995  Huang ....................................... 280/642

*Primary Examiner*—Richard M. Camby

[57] ABSTRACT

A baby carriage includes a pair of rear legs, a pair of front legs, a pair of handles and a pair of arm rests pivotally coupled together. The handles are pivotally coupled to the front legs by a pair of coupling mechanisms. The coupling mechanisms each includes two members which may be engaged with each other and which may be disengaged from each other so as to allow folding of the handles toward the rear legs. Two pairs of wheels are secured to the front and rear legs and a brake mechanism may easily brake the wheels.

1 Claim, 10 Drawing Sheets

FOLDING BABY CARRIAGE

BACKGROUND OF THE INVENTION

1. Field of the Invention

The present invention relates to a baby carriage, and more particularly to a folding baby carriage.

2. Description of the Prior Art

Typical baby carriages comprise a configuration that may be folded to a rather compact configuration for storing and for transportation purposes. However, the typical baby carriages may not be easily folded. In addition, the typical baby carriages may not be easily braked.

The present invention has arisen to mitigate and/or obviate the afore-described disadvantages of the conventional baby carriages.

SUMMARY OF THE INVENTION

The primary objective of the present invention is to provide a baby carriage which may be easily folded to a compact configuration and which may be easily braked.

In accordance with one aspect of the invention, there is provided a baby carriage comprising a pair of rear legs each having a bottom portion and an upper portion, a pair of front legs each having an upper portion and a middle portion, wheel means secured to the bottom portion of the rear legs and including a hub and a plurality of engaging notches provided around the hub, a pair of brake mechanisms provided in the bottom portions of the rear legs and each including a tube secured to the rear legs, a block pivotally coupling the wheel means to the tube and including a space formed therein for engaging with a pawl and including an oblong hole formed therein, the pawl including a pair of tapered surfaces, a brake arm including two end portions engaged through the oblong holes of the blocks and movable along the oblong holes to engage with or to disengage from the engaging notches so as to brake or release the wheel means, and means for biasing the pawl to engage with the end portions of the brake arm so as to position the brake arm in engagement with or in disengagement from the engaging notches, a pair of handles pivotally coupled to the upper portion of the rear legs, a pair of coupling mechanisms including a pair of first members pivotally coupling the front legs and having a cavity formed therein, and including a pair of second members secured to the rear legs and pivotally coupled to the first members, the first members each including an aperture for engaging with the upper portion of the rear legs, and the rear legs being disengaged from the first members when the first members are pulled from the cavities, and an arm rest means including a first end portion pivotally coupled to the rear legs and including a second end portion, a lever including a middle portion pivotally coupled to the rear legs and including a first end having a bracket formed therein, a link pivotally coupled between the second end portion of the arm rest means and the bracket of the lever. The rear legs are disengaged from the apertures of the first members so as to allow bending of the handles toward the rear legs when the first members are pulled away from the rear legs, and the front legs are moved to engage with the rear legs so as to form a compact configuration for storing and for transportation purposes.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
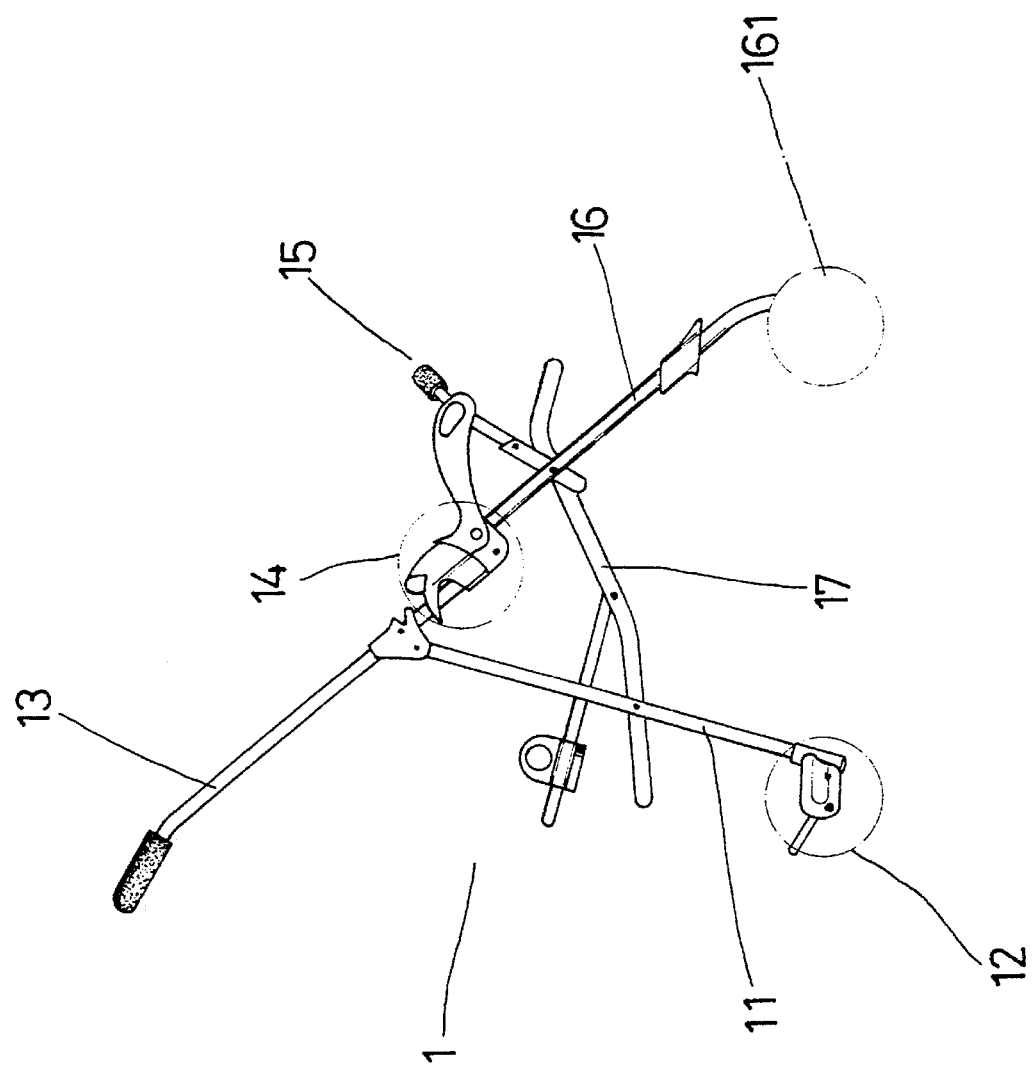
FIG. 1 is a side view of a baby carriage in accordance with the present invention.

Referring to the drawings, and initially to FIG. 1, a baby carriage in accordance with the present invention is indicated by the reference numeral 1 and comprises a pair of rear legs 11 each having a wheel and brake mechanism 12 provided in the bottom portion. A pair of handles 13 are pivotally coupled to the upper portion of the rear legs 11 and are pivotally coupled to a pair of front legs 16 by a coupling mechanism 14. An arm rest means 15 is coupled to the coupling mechanism 14. The front legs 16 each includes a wheel means 161 provided on the bottom portion. A seat frame 17 is pivotally coupled between the front legs 16 and the rear legs 11.

Figure 2:
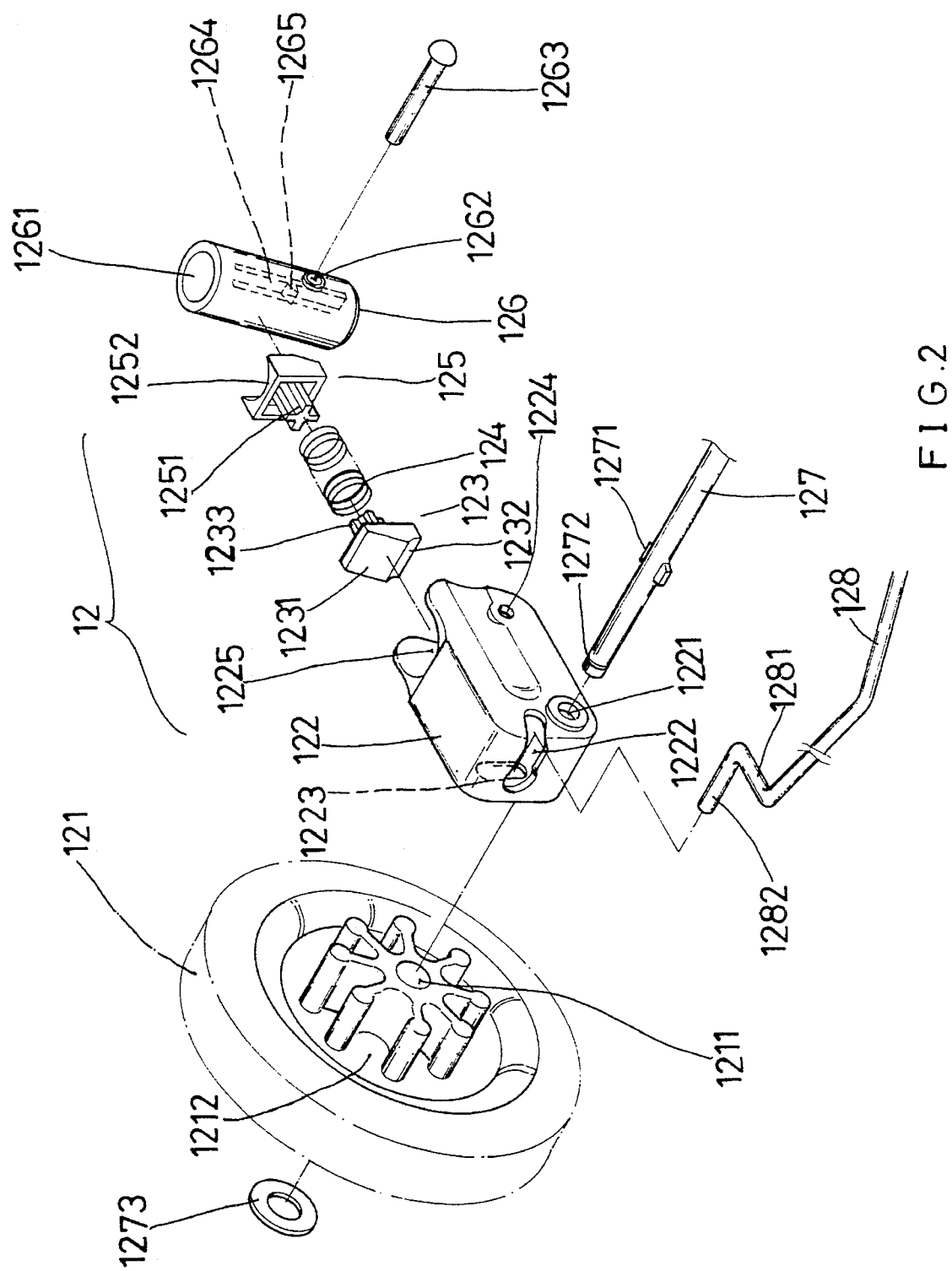
FIG. 2 is a partial exploded view of a brake mechanism.
Figure 3:
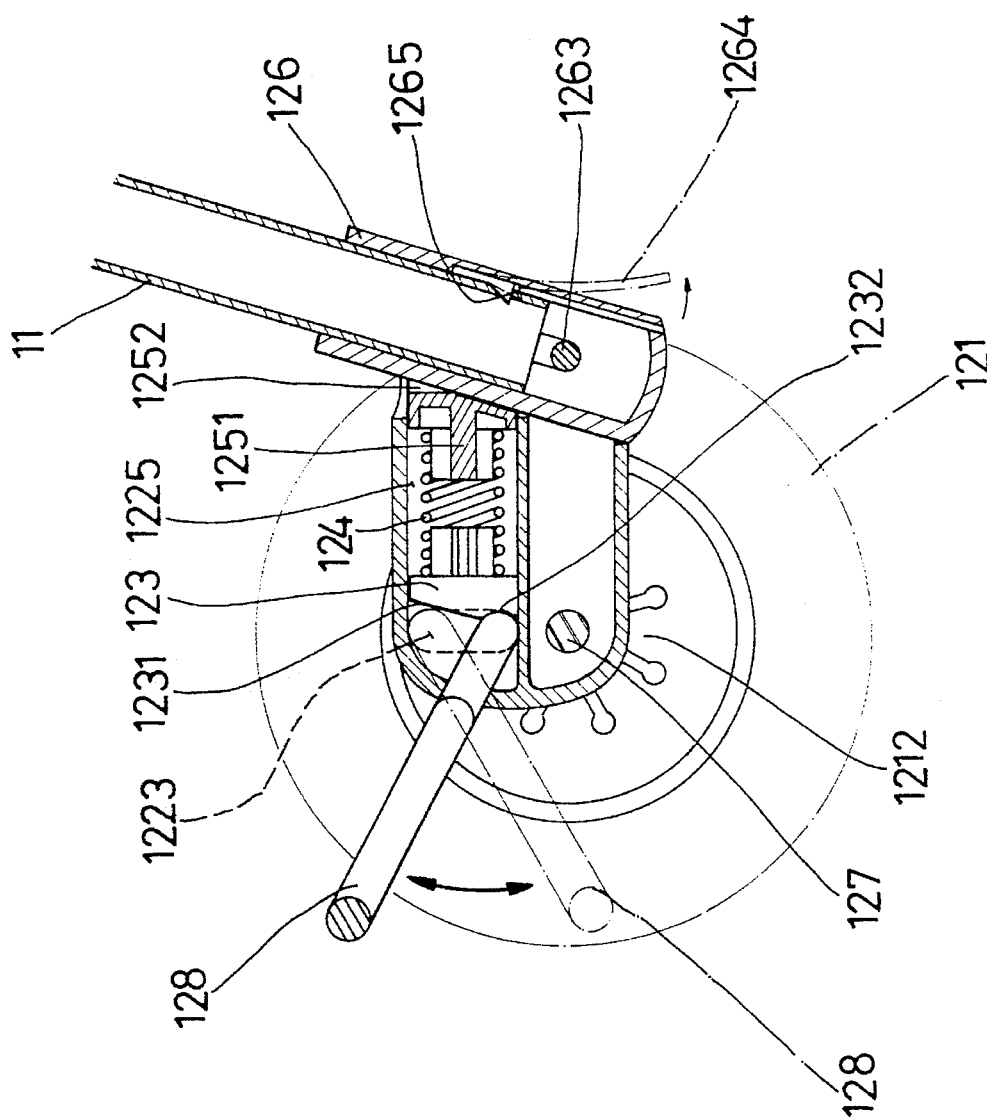
FIG. 3 is a cross sectional view of the brake mechanism.
Figure 7:
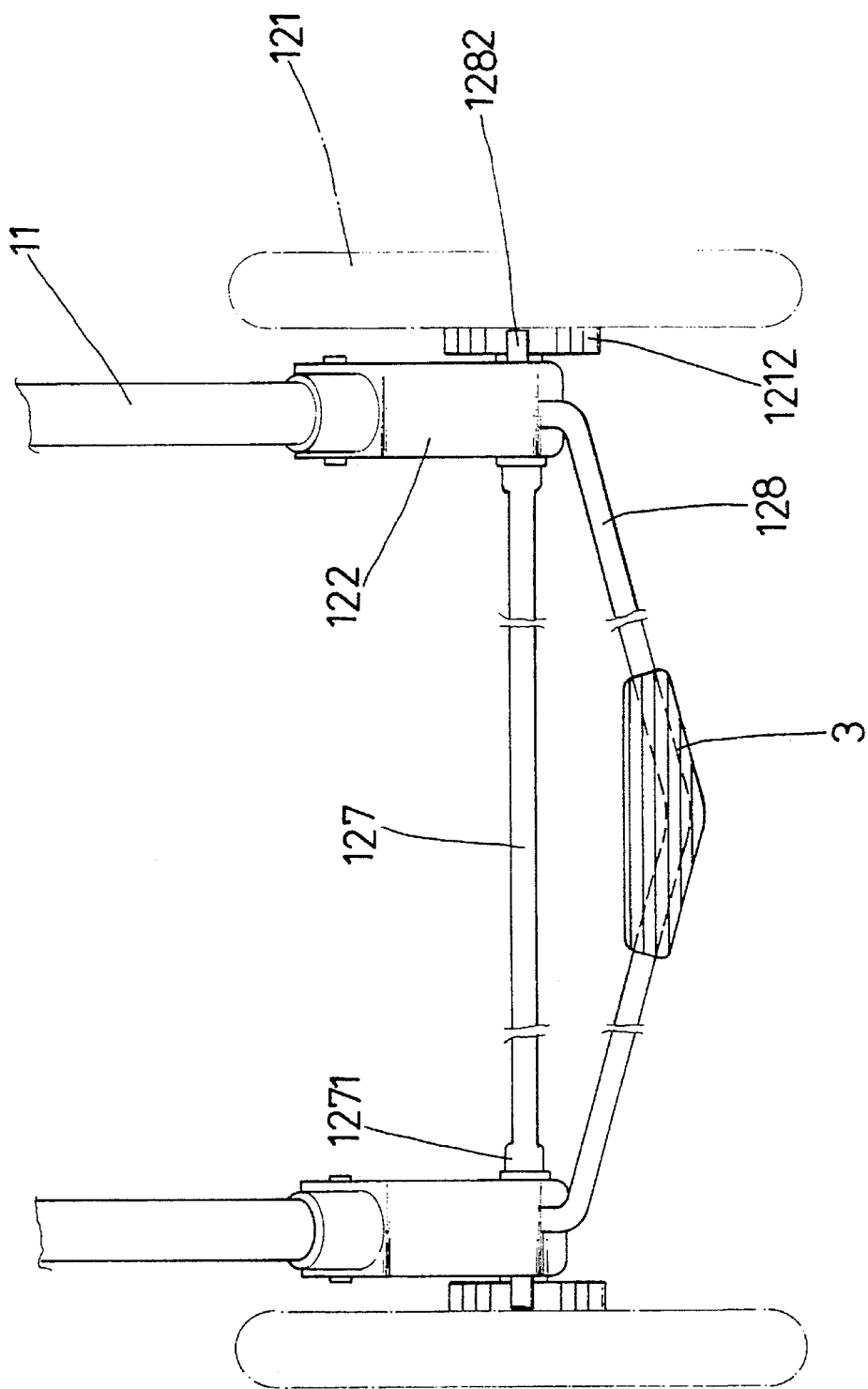
FIG. 7 is a plane view illustrating the bottom portion of the baby carriage.

Referring next to FIGS. 2, 3 and 7, the wheel and brake mechanisms 12 each includes a wheel 121 having a hub 1211 provided therein and having a number of engaging notches 1212 formed around the hub 1211. A block 122 includes a hollow interior and includes a hole 1221 for engaging with an axle 127. The axle 127 includes two ends each having a projection means 1271 for engaging with the block 122 and each having a free end engaged through the hole 1221 of the block 122 and through the hub 1211 of the wheel 121 and each having an annular groove 1272 for engaging with a fastening member. The blocks 122 each includes a passage 1222 and an oblong hole 1223 for engaging with a bent portion 1281 and an extension 1282 of a brake arm 128 respectively. The extension 1282 of the brake arm 128 may be moved along the oblong hole 1223 to two positions in engagement with either of the engaging notches 1212 and in disengagement from the engaging notches 1212. The wheel 121 is braked when the extension 1282 is engaged in the engaging notches 1212 and is free when the extension 1282 is disengaged from the engaging notches 1212. The block 122 includes a space 1225 formed therein for receiving a pawl 123, a spring 124 and a stop 125. The pawl 123 includes two tapered surfaces 1231, 1232 for engaging with the extension 1282 of the brake arm 128 so as to position the extension 1282 in the two positions in either engagement or disengagement from the engaging notches 1212. The pawl 123 and the stop 125 each includes a projection 1233, 1251 for engaging with the spring 124. The stop 125 includes a recess 1252 for engaging with a tube 126 which is provided for engaging with the rear legs 11. A pin element 1263 is engaged through the holes 1262 of the tube 126 and engaged through the holes 1224 of the block 122 so as to pivotally couple the tube 126 to the block 122. The tube 126 includes a resilient blade 1264 having a catch 1265 for engaging with the rear leg 11 so as to secure the rear leg 11 to the tube 126. A foot pedal 3 is secured to the brake arm 128 for operating the brake arm 128 (FIG. 7).

Figure 4:
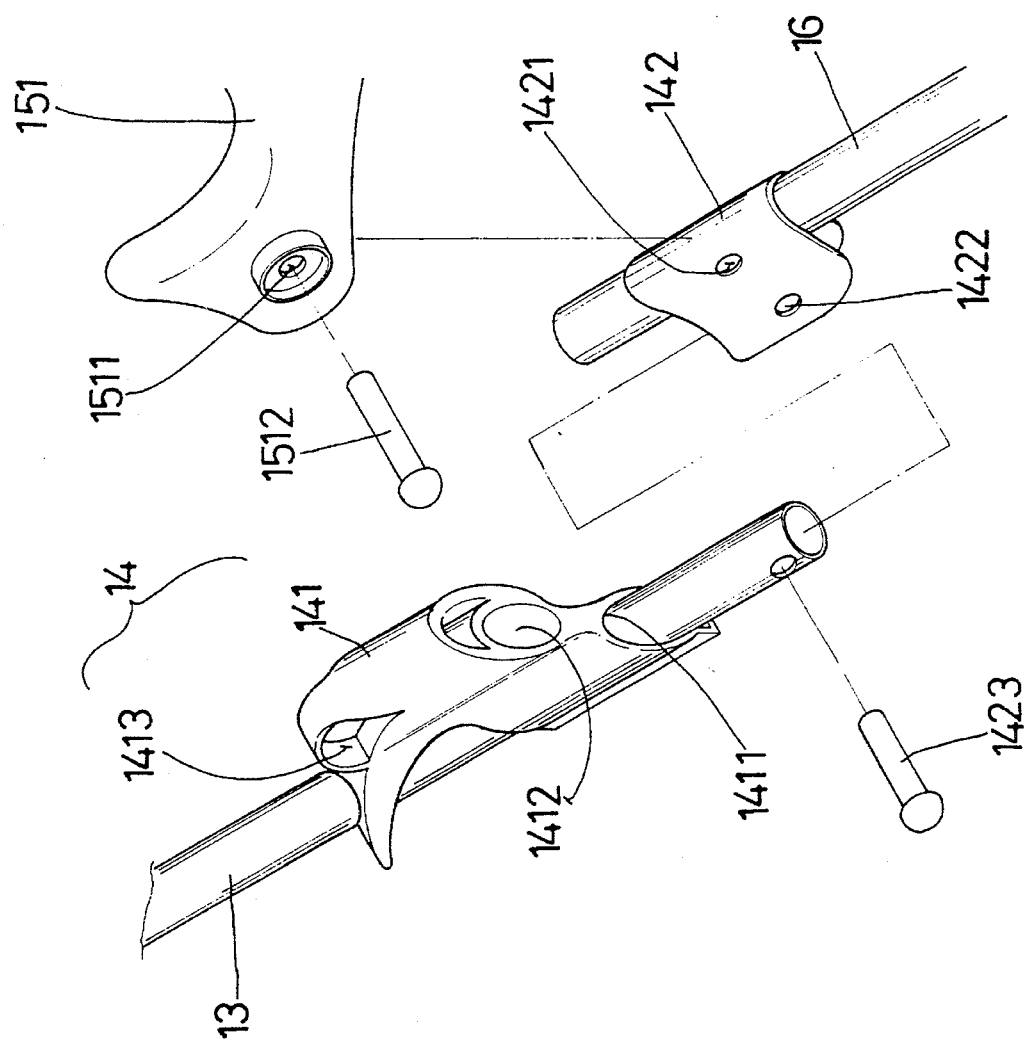
FIG. 4 is a partial exploded view of a coupling mechanism.
Figure 5:
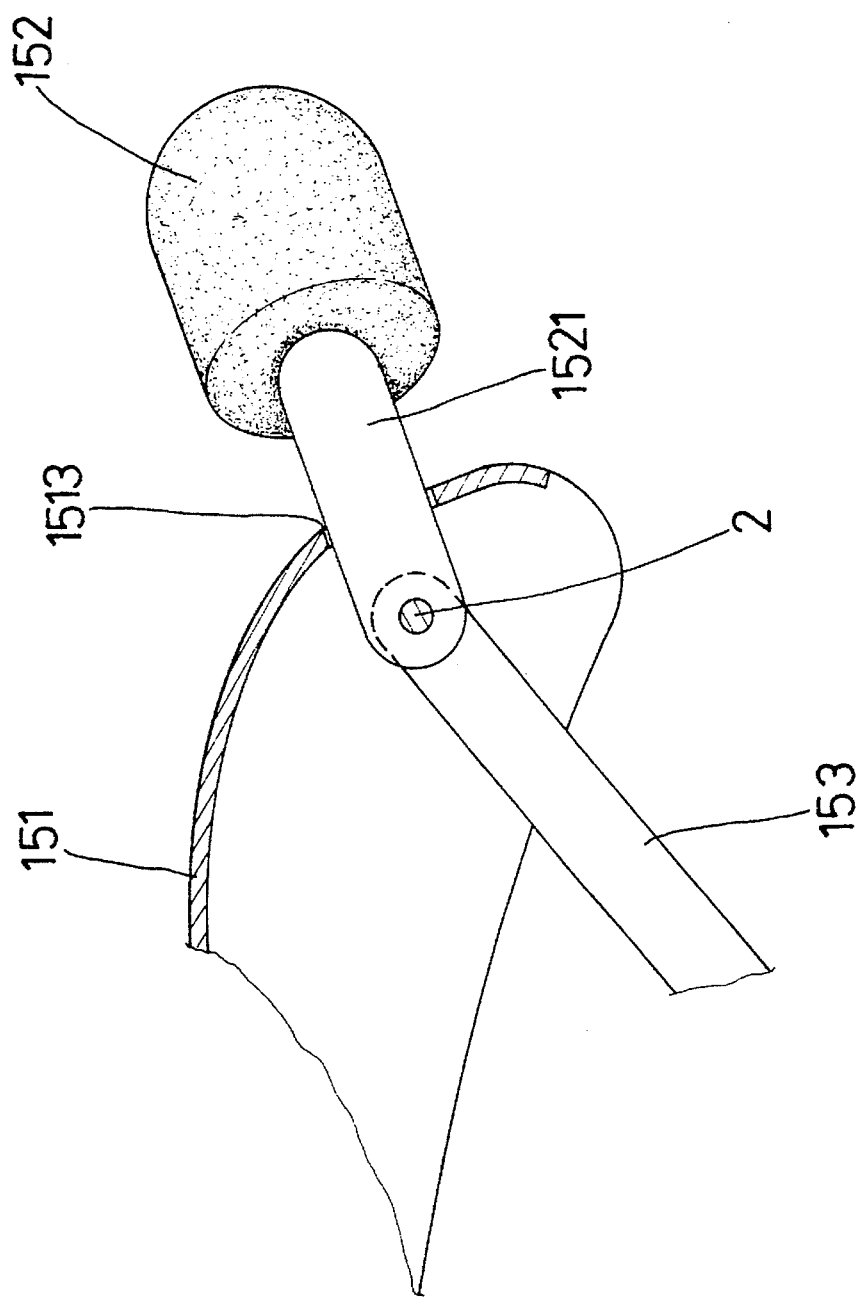
FIG. 5 is a partial cross sectional view of a coupling mechanism.
Figure 6:
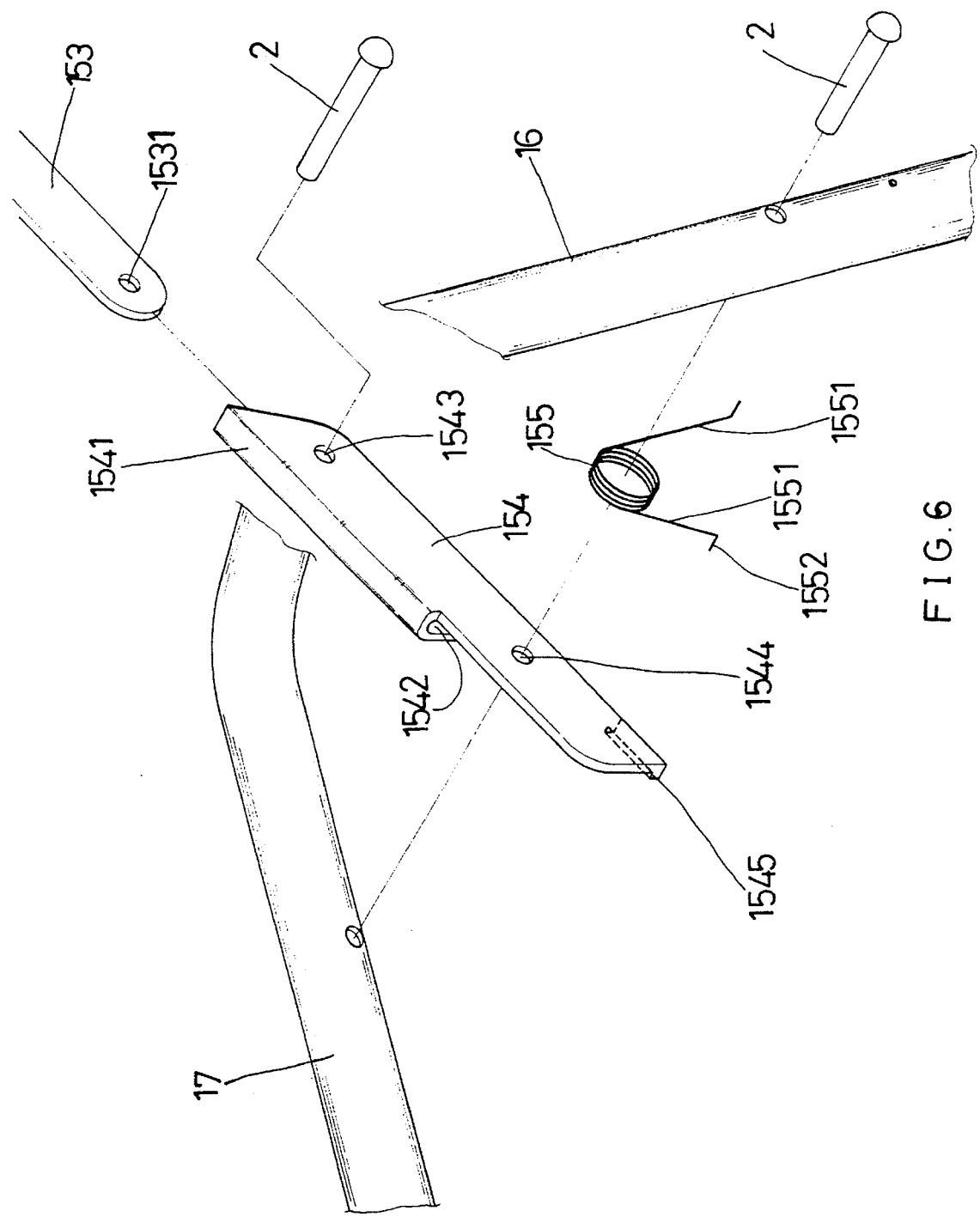
FIG. 6 is a partial exploded view of another coupling mechanism.

Referring next to FIGS. 4, 5 and 6, the coupling mechanism 14 includes a first member 141 having a cavity 1413 and having a hole 1411 engaged on the handle 13 and having an aperture 1412 for engaging with the front leg 16. A second member 142 is secured on the rear leg 16 by a screw 1421 and includes a hole 1422 for engaging with a pin 1423 which pivotally couples the handle 13 to the rear leg 16.

The arm rest means 15 includes an arm 15I having a hole 1511 for engaging with a pin 1512 which pivotally couples the arm 151 to the rear leg 16. The arm 151 includes two holes 1513. A beam 152 includes two limbs 1521 engaged through the holes 1513 and secured to the arm 151 by a pin element 2. A link 153 has one end pivotally coupled to the pin element 2 and has a hole 1531 formed in the other end. A lever 154 has a hole 1544 formed in the middle portion for pivotally coupling to the rear leg 16 by a pin element 2 and includes a bracket 1541 having a channel 1542 formed therein for engaging with the link 153 which is pivotally coupled to the lever 154 by a pin element 2. The pin element 2 is engaged through the hole 1543 of the lever 154 which includes a flange 1545. A spring 155 is engaged on the pin element 2 for coupling the lever 154 to the rear leg 16 and includes two legs 1551 having hook means 1552 for engaging with the flange 1545 and for securing to the rear leg 16 respectively.

Figure 8:
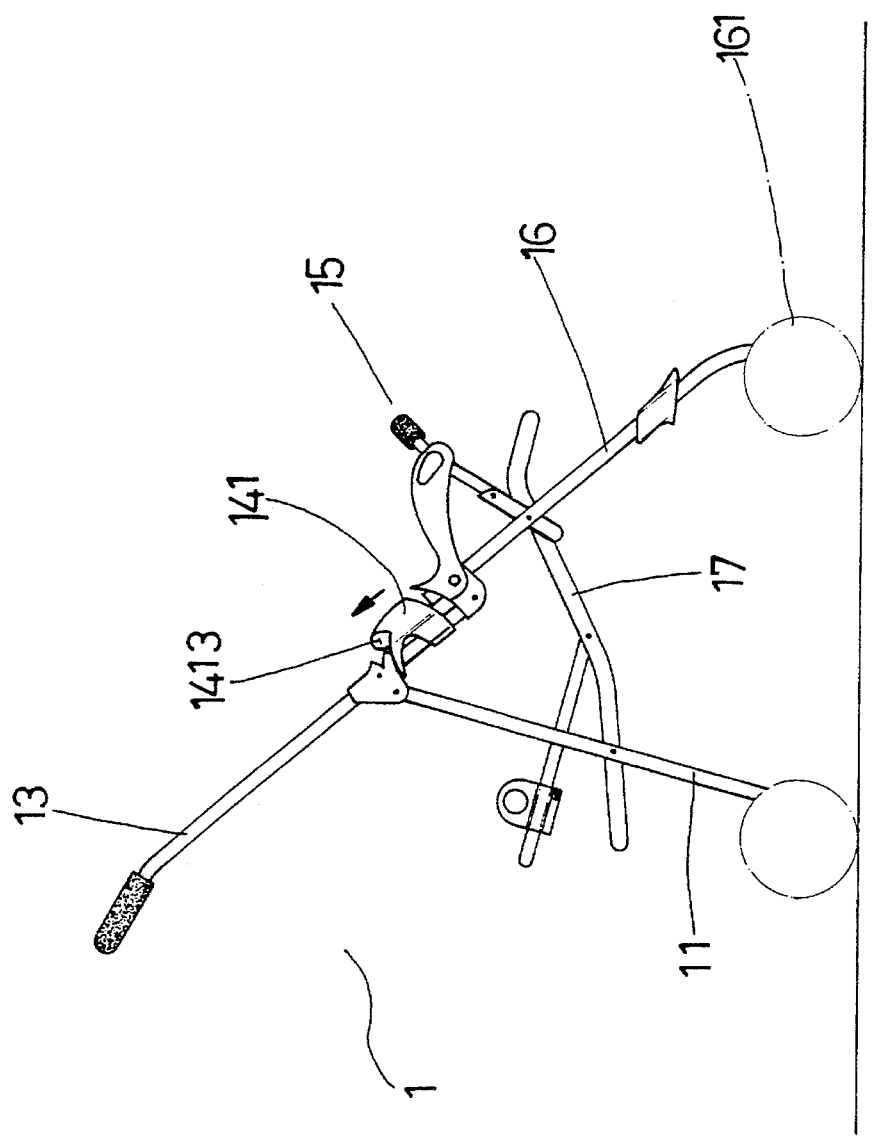
FIGS. 8, 9, 10 are side views illustrating the folding operation of the baby carriage.
Figure 9:
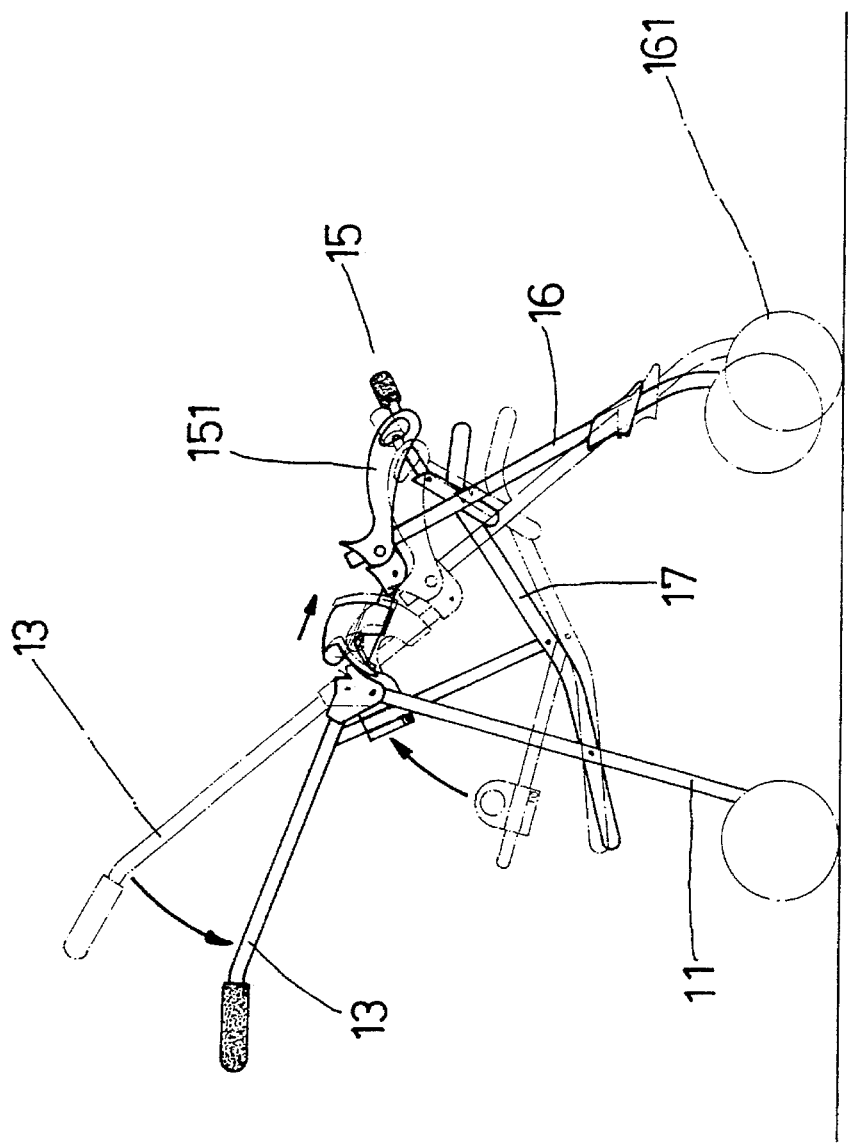
Figure 10:
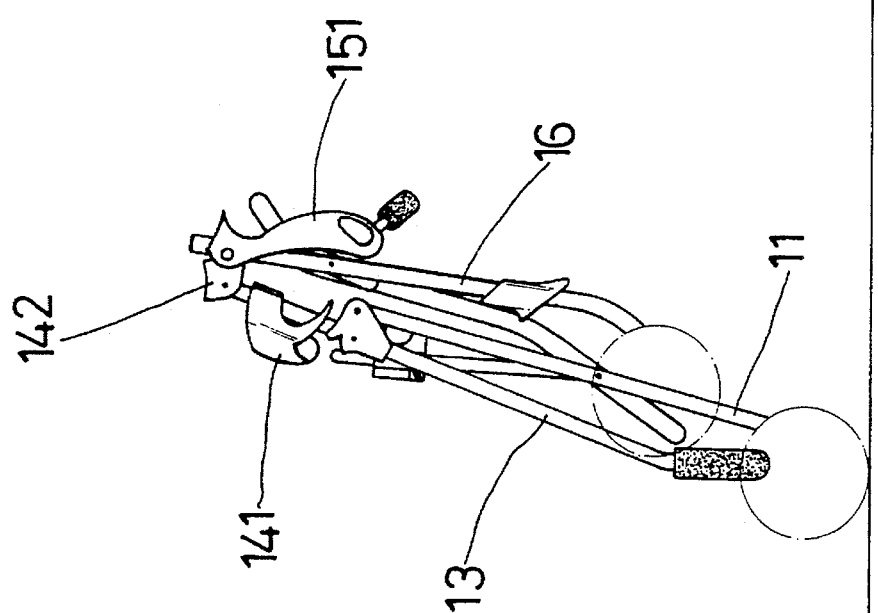

Referring next to FIG. 8, when the fingers of the user are engaged in the cavities 1413 of the first member 141 for disengaging the rear leg 16 from the aperture 1412, the handle 13 may be folded downward to engage with the rear legs 11 as shown in FIG. 9. The front legs 16 are then moved to engage with the rear legs 11 and the arm 151 may also be folded to engage with the front legs 16 by the link 153 and the lever 154 as shown in FIG. 10. The spring 155 may recover the lever 154 when the handle 13 is moved away from the rear legs 11 again, in order to unfold the baby carriage to the configuration as shown in FIG. 1.

Accordingly, the baby carriage may be easily folded to a compact configuration and may be easily braked by operating the foot pedal 3.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A baby carriage comprising:

a pair of rear legs each having a bottom portion and an upper portion, a pair of front legs each having an upper portion and a middle portion, wheel means secured to said bottom portion of said rear legs and including a hub and a plurality of engaging notches provided around said hub, a pair of brake mechanisms provided in said bottom portions of said rear legs and each including a tube secured to said rear legs, a block pivotally coupling said wheel means to said tube and including a space formed therein for engaging with a pawl and including an oblong hole formed therein, said pawl including a pair of tapered surfaces, a brake arm including two end portions engaged through said oblong holes of said blocks and movable along said oblong holes to engage with or to disengage from said engaging notches so as to brake or release said wheel means, and means for biasing said pawl to engage with said end portions of said brake arm so as to position said brake arm in engagement with or in disengagement from said engaging notches, a pair of handles pivotally coupled to said upper portion of the rear legs, a pair of coupling mechanisms including a pair of first members pivotally coupling said front legs and having a cavity formed therein, and including a pair of second members secured to said rear legs and pivotally coupled to said first members, said first members each including an aperture for engaging with said upper portion of said rear legs, and said rear legs being disengaged from said first members when said first members are pulled from said cavities, and an arm rest means including a first end portion pivotally coupled to said rear legs and including a second end portion, a lever including a middle portion pivotally coupled to said rear legs and including a first end having a bracket formed therein, a link pivotally coupled between said second end portion of said arm rest means and said bracket of said lever, said rear legs being disengaged from said apertures of said first members so as to allow bending of said handles toward said rear legs when said first members are pulled away from said rear legs, and said front legs being moved to engage with said rear legs so as to form a compact configuration for storing and for transportation purposes.

* * * * *